Feb. 28, 1961        R. R. PORTER        2,973,319
PROCESS OF CONTACTING LIQUIDS WITH SOLIDS
Original Filed Jan. 5, 1955        2 Sheets-Sheet 1

United States Patent Office 2,973,319
Patented Feb. 28, 1961

2,973,319

PROCESS OF CONTACTING LIQUIDS WITH SOLIDS

Robert R. Porter, Salt Lake City, Utah, assignor of one-half to Transvaal & Orange Free State Chamber of Mines, Johannesburg, Union of South Africa Continuation of application Ser. No. 480,020, Jan. 5, 1955. This application Apr. 21, 1959, Ser. No. 807,951

12 Claims. (Cl. 210—33)

This invention relates to a method of and apparatus for contacting liquids with solids. The present application is a continuation of my copending allowed application Serial Number 480,020, filed January 5, 1955, entitled, "Contacting Liquids With Solids," now abandoned.

The invention finds particular application in ion exchange processes. While it will be discussed mainly with reference to such processes, it is to be understood that the invention also applies in other instances where liquids are contacted with solids, e.g. in washing granular materials.

In ion exchange processes, it is known to confine the ion exchange material as a fixed bed on a liquid pervious support. In certain of these processes designed for semi-continuous operation, fresh exchange material is pumped in at the bottom of the bed, periodically, which forces exchange material at the top of the bed to overflow. Pressure for removal of spent material is transmitted through the whole bed, which disturbs the distribution of material in the bed and leads to other undesirable effects, such as channelling. These defects may be minimised to some extent by adding very small increments of material to the bed after short intervals of time, but this continuous interruption of the bed is cumbersome, inefficient, and expensive.

An object of the invention is to provide a fixed bed process in which the steps of removing material from and adding material to the bed are independent of one another, i.e. the main body of the bed is left undisturbed by these operations.

A further object is to provide a bed in which the quantities removed from or added to the bed are not necessarily dependent upon one another and do not affect the ion exchange process as such.

According to this invention, a method of contacting liquids with discrete solids is provided which includes confining a mass of the solid between two horizontal, liquid-pervious walls as a liquids-solids contact column, withdrawing contacted solids from the mass adjacent the lower wall by hydraulically undercutting the column and flowing off the lowermost portion thereof after the liquid has been passed through the column, and replenishing the mass by introducing solids adjacent the upper wall.

It is a feature of the invention that the solids are withdrawn by diverting the flow of liquid through an outlet in or adjacent the first wall so as to undercut the mass.

The solids may be introduced adjacent the upper wall in the form of a slurry under a hydrostatic head.

The method of the invention is particularly useful where the solids are ion exchange materials, and therefore provides an upflow, countercurrent, ion exchange process in which ion exchange is effected with a mass of ion exchange material which is contacted with a liquid in the usual manner but in which fully contacted solids are removed from the bottom of the column as described above, in which such fully contacted solids withdrawn adjacent the lower wall are introduced between a second pair of walls to form a second column for regeneration by contact with another liquid in the manner described above, and in which solids withdrawn adjacent the lower wall of the second pair of walls are fed between a third pair of walls and treated with washing liquid in the manner described above.

In the ion exchange process, the washed solids may again be introduced adjacent the upper wall of the first pair of walls for re-use as fresh ion exchange material.

An ion exchange installation according to the invention usually comprises the combination of three exchange columns, with means to feed solids withdrawn from adjacent the lower wall of the first column into the second column adjacent the upper wall thereof, and means to feed solids withdrawn from adjacent the lower wall of the second column, in turn, into the third column adjacent the upper wall thereof.

The walls referred to above may be any conventional filter elements. Thus, where the flow through the bed is vertical, the lower filter element may consist in a gravel bed and the top filter element in a screen or screen supporting a filter cloth.

An example of the invention is discussed hereunder with reference to the accompanying drawings, in which Figure 1 is an elevation, partly in section, of an apparatus for contacting liquids with solids;

Figure 1:
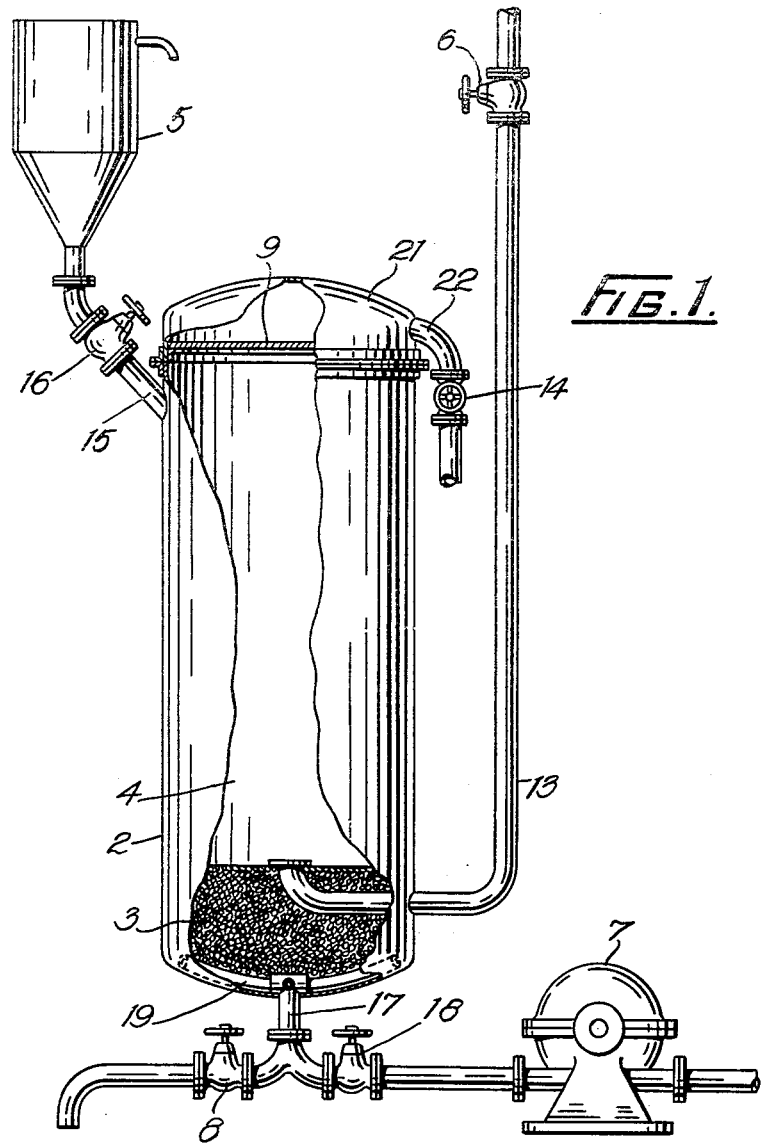

The apparatus illustrated in Figure 1 consists in a cylindrical tank or container 2 in which the contacting operation takes place. At the base of the container there is a distributor 19 to which liquid to be treated is supplied by means of a pump 7, a valve 18, and an inlet pipe 17. For purposes to be described later, the pipe 17 is also connected to a drain valve 8.

The distributor 19 is covered with a layer of gravel 3. A pipe 13 enters the tank 2 laterally and passes through the gravel 3 to the vertical axis of the tank where it is bent to terminate just above the layer of gravel 3. The pipe 13 is controlled by a valve 6.

Figure 2:
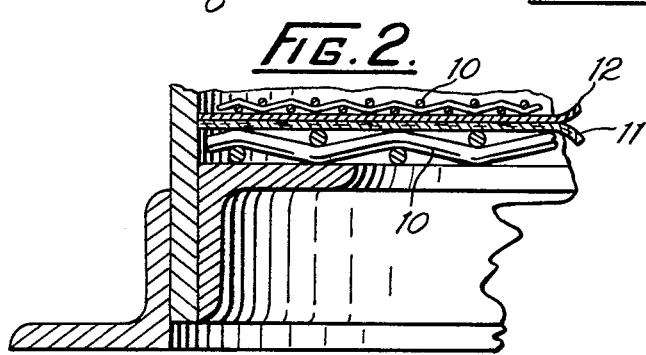
Figure 2 is a detailed sectional fragmentary view of part of Figure 1.

The top of the tank 2 is formed as a hollow lid 21. Below the lid 21 there is a filter element 9, which is illustrated in detail in Figure 2 and comprises a wide mesh screen 10, on top of which is laid a coco matting 11, a jute filter cloth 12, and, finally, another wire mesh screen 10. The lid 21 is connected to an outlet pipe 22 controlled by a valve 14.

Above the tank 2 is a slurry storage tank 5, which is connected to tank 2 through a valve 16 and an inlet pipe 15 that leads to the space 4 between the gravel bed 3 and screen 9 at a point just below such screen.

In use, the space 4 is filled with discrete solid material, such as ion exchange resin.

The operation of the apparatus will now be described with reference to ion exchange operations, but it is to be understood that the processes of the invention are not limited to these operations.

Assuming that the space 4 is completely filled with fresh resin, the valve 14 will be open and the valves 6 and 16 will be shut. The valve 8 is also shut while the valve 18 is open. Liquid delivered by the pump 7 passes from the distributor 19 through the gravel 3, up the column of resin in the space 4, through the screen 9 and out through the pipe 22.

After a predetermined period of time, a zone of resin near the gravel 3 will be sufficiently spent to require removal from the tank 2. This is done by shutting the valve 14 and opening the valve 6 while the pump 7 is still operating. The liquid now passes from the container via the pipe 13 and in the process undercuts part of the pass of ion exchange material and removes it.

When the required zone has been thus hydraulically undercut and removed, the valve 6 is closed, the distributor 19 disconnected from the pump by shutting the valve 18, and the drain valve 8 opened. With the drain valve open and the pump 7 no longer furnishing hydrostatic pressure to support the undercut column of resin, the entire remaining column drops by gravity onto the upper surface of gravel bed 3, thereby providing resin-replenishment space at the top of the column.

The valve 16 is now opened, and resin slurry from the tank 5 forces its way in between the filter elements 9 and 3 to fill the space 4 and to displace excess liquid through the drain valve 8. This liquid is collected in any suitable manner.

The bed in the space 4 is now ready for the next cycle of operations.

The embodiment described above is not only suitable for the ion exchange process proper but also for regenerating the spent ion exchange material. By the same token, regenerated ion exchange material may be washed to free it from excess regenerating liquid. The method and apparatus is also suitable for processes entirely divorced from ion exchange processes. Thus the solid may be a substance subjected to treatment by a leaching solution.

Figure 3:
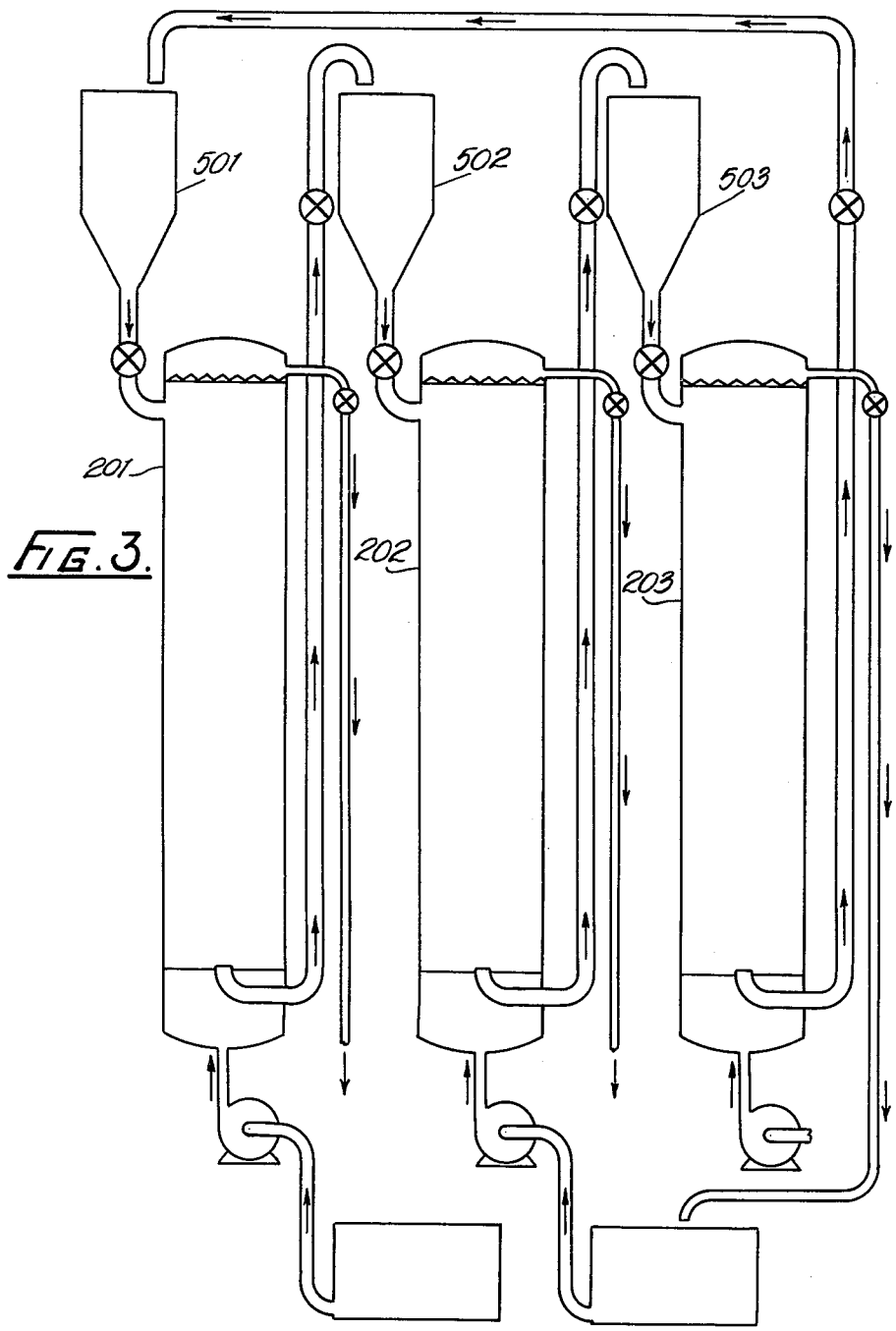
Figure 3 is a diagrammatic view of an ion exchange installation.

As far as ion exchange is concerned, the invention in a further embodiment (illustrated in Figure 3) provides the combination of three containers 201, 202 and 203 as described above. Solids removed from the first container 201 are discharged into the storage tank 502 of the second container 202, and from the latter into the storage tank 503 of the third tank 203, which, in turn, may discharge into the storage tank 501 of the first container 201.

The liquid used in the first container 201 is that which has to be subjected to the ion exchange process, e.g. for the recovery of a valuable ion or the removal of an undesirable ion. The liquid for the second container 202 is adapted to regenerate the spent or eluted ion exchange material. Depending on the nature of the ion removed in the first container, the liquid running off from the second container 202 may be subjected to further treatment or may be allowed to run to waste. In the third container 203, the regenerated ion exchange material is subjected to a washing operation to remove excess regenerating reagent. As said above the washed material may be fed directly into the storage tank 501 of the first container 201, but usually the material is subjected to further treatment before it is fed in slurry form back to the storage tank of the first container.

The washing liquid may be collected and used for making up the solution to be used in the second column 202.

The invention provides a method of and apparatus for continuously contacting liquids with solids in which the contacting operation is periodically suspended for the hydraulic undercutting and removal and for the adding of solids in batches. The batch removal and the normal running of the plant may be controlled by completely automatic apparatus. Thus once the extent of a zone to be removed and the time for formation of such a zone has been determined the valves may be operated by suitable timing devices.

I claim:

1. A method of operating a liquids-solids contact column in which a mass of discrete solid particles is maintained as a fixed standing column for permeation by a liquid, comprising flowing the liquid under pressure upwardly through the standing column of solid particles, from a low level thereof, for contact purposes until the lowermost portion of said mass has gone through sufficient liquid contact; maintaining the hydrostatic pressure of the liquid on said standing column to prevent descent thereof, while diverting flow of liquid from said standing column in the vicinity of said low level so as to undercut and remove said lowermost portion of the mass of discrete solid particles; stopping the said flowing of the liquid; adding fresh discrete solid particles to the standing column at an upper level thereof, while permitting liquid to drain therefrom at said lowermost portion so as to effect descent of said mass; again flowing the liquid under pressure upwardly through the standing column; and continually repeating the above procedure.

2. The method of claim 1, wherein the fresh discrete solid particles are added in the form of a slurry under a hydrostatic head.

3. The method of claim 2, wherein the mass of discrete solid particles making up the contact column is liquid-permeably confined at its upper and lower ends against displacement; wherein the slurry of fresh discrete particles is introduced immediately below the confined upper end of the said mass of particles; and wherein the lowermost portion of the mass is removed from the standing column immediately above the said confined lower end of said mass of particles.

4. The method of claim 3, wherein the liquids-solids contact column is a component of a system comprising a plurality of at least two similar liquids-solids contact columns; wherein the flow of liquid diverted from the first contact column together with entrained solid particles is introduced at the upper end of the next succeeding contact column as the fresh slurry added to the latter; and similarly diverting flow of liquid and entrained solid particles and similarly introducing same as fresh slurry from column to column successively along the said plurality of contact columns, the flow of liquid and entrained solids diverted from the last contact column in the said plurality being added at the upper end of the said first contact column.

5. A method of operating a liquids-solids contact column in which a mass of discrete solid particles is maintained as a fixed standing column for permeation by a liquid, comprising flowing the liquid under pressure upwardly through the standing column of solid particles, from a low level thereof, for contact purposes until the lowermost portion of said mass has gone through sufficient liquid contact; maintaining the standing column in fixed position above said lowermost portion of the mass while diverting flow of said liquid in the vicinity of said low level so as to undercut and remove said lowermost portion of the mass of discrete solid particles; stopping the said flowing of the liquid; adding fresh discrete solid particles to the standing column at an upper level thereof, while permitting liquid to drain therefrom at said lowermost portion so as to effect descent of said mass; again flowing the liquid under pressure upwardly through the standing column; and continually repeating the above procedure.

6. The method of claim 5, wherein the fresh discrete solid particles are added in the form of a slurry under a hydrostatic head.

7. The method of claim 6, wherein the mass of discrete solid particles making up the contact column is liquid-permeably confined at its upper and lower ends against displacement; wherein the slurry of fresh discrete particles is introduced immediately below the confined upper end of the said mass of particles; and wherein the lowermost portion of the mass is removed from the standing column immediately above the said confined lower end of said mass of particles.

8. The method of claim 7, wherein the liquids-solids contact column is a component of a system comprising a plurality of at least two similar liquids-solids contact columns; wherein the flow of liquid diverted from the first contact column together with entrained solid particles is introduced at the upper end of the next succeeding contact column as the fresh slurry added to the latter; and similarly diverting flow of liquid and entrained solid particles and similarly introducing same as fresh slurry from column to column, successively, along the said plurality of contact columns, the flow of liquid and entrained solids diverted from the last contact column in the said plurality being added at the upper end of the said first contact column.

9. A method of operating an ion-exchange column in which a mass of discrete solid particles of an exchange material is maintained for permeation by a liquid, comprising flowing the liquid under pressure upwardly through the said mass of solid particles, from a low level thereof, for contact purposes until the lower portion of said mass has gone through sufficient liquid contact; hydraulically undercutting said mass to flow the lowermost portion thereof from the column, while maintaining said liquid flow and its hydraulic pressure upon said mass; stopping said liquid flow; draining liquid from the bottom of the column; introducing fresh discrete solid particles to the column at the upper end of said mass; and continually repeating such procedure.

10. The method of claim 9, wherein the fresh discrete solid particles are added in the form of a slurry under a hydrostatic head.

11. The method of claim 10, wherein the mass of discrete solid particles is liquid-permeably confined at its upper and lower ends against displacement; wherein the slurry of fresh discrete particles is introduced immediately below the confined upper end of the said mass of particles; and wherein the lowermost portion of the mass is removed immediately above the said confined lower end of said mass of particles.

12. The method of claim 11, wherein the liquids-solids contact column is a component of a system comprising a plurality of at least two similar liquids-solids contact columns; wherein the flow of hydraulic undercutting liquid together with entrained solid particles from the first contact column is introduced to the next succeeding contact column at the upper end of the mass of particles therein; and similarly handling the flow of hydraulic undercutting liquid and entrained solid particles from column to column, successively, along the said plurality of contact columns, the flow of hydraulic undercutting liquid and entrained solids from the last contact column in the said plurality being introduced into the said first contact column.

References Cited in the file of this patent

"Chemical Week," June 9, 1956, pages 74–76.